United States Patent [19]
Barnier et al.

[11] Patent Number: 5,171,409
[45] Date of Patent: Dec. 15, 1992

[54] CONTINUOUS PROCESS OF SEPARATING ELECTRICALLY CHARGED SOLID, PULVERULENT PARTICLES BY ELECTROPHORESIS AND ELECTROOSMOSIS

[75] Inventors: Henri Barnier, Aix-En-Provence; Bernard Barroyer, Plan D'Orgon; Claude Cabannes, Eygalieres, all of France

[73] Assignee: Omya S.A., Paris, France

[21] Appl. No.: 724,506

[22] Filed: Jun. 28, 1991

Related U.S. Application Data

[63] Continuation of Ser. No. 582,414, Sep. 14, 1990, abandoned, which is a continuation of Ser. No. 449,309, Dec. 6, 1989, abandoned, which is a continuation of Ser. No. 352,615, May 15, 1989, abandoned, which is a continuation of Ser. No. 075,660, Jul. 20, 1987, abandoned.

[30] Foreign Application Priority Data

Jul. 18, 1986 [FR] France ................. 86 10649

[51] Int. Cl.⁵ .............................................. C25B 7/00
[52] U.S. Cl. .............................................. 204/182.2
[58] Field of Search ............... 204/182.2, 129.1, 149

[56] References Cited

U.S. PATENT DOCUMENTS

| | | | |
|---|---|---|---|
| 4,003,811 | 1/1977 | Kunkle | 204/182.2 |
| 4,168,222 | 9/1979 | Freeman | 204/300 R |
| 4,312,729 | 1/1982 | Wills | 204/180 P |
| 4,501,648 | 2/1985 | Ritter | 204/149 |
| 4,615,776 | 10/1986 | Sasaki | 204/129.1 |
| 4,719,019 | 1/1988 | Vasan | 210/752 |

FOREIGN PATENT DOCUMENTS 8302446 7/1983 PCT Int'l Appl. ................. 210/749

Primary Examiner—John Niebling
Assistant Examiner—Bruce F. Bell
Attorney, Agent, or Firm—Oblon, Spivak, McClelland, Maier & Neustadt

[57] ABSTRACT

Process of continuously separating electrically charged, solid pulverulent materials in the form of a suspension in an electrophoresis and electroosmosis cell, characterized in that a fraction of the catholyte is drained off, that a portion thereof is treated with an acid, preferably gaseous, agent, that the treated portion is re-introduced into the cathode compartment, whereas the other part of the drained-off fraction is eliminated.

The acid treatment is effected during continous pH measurements on the drained-off fraction of the catholyte.

16 Claims, 1 Drawing Sheet

CONTINUOUS PROCESS OF SEPARATING ELECTRICALLY CHARGED SOLID, PULVERULENT PARTICLES BY ELECTROPHORESIS AND ELECTROOSMOSIS

This application is a continuation of application Ser. No. 07/582,414, filed on Sep. 14, 1990, now abandoned, which is a continuation of application Ser. No. 07/449,309, filed on Dec. 6, 1989, now abandoned, which is a continuation of application Ser. No. 352,615, filed on May 15, 1989, now abandoned, which is a continuation of Ser. No. 075,660 filed, Jul. 20, 1987, now abandoned.

BACKGROUND OF THE INVENTION

The present invention relates to a process of continuously separating electrically charged, solid pulverulent materials by electrophoresis and electroosmosis. The invention is used on solid materials which, suspended in an aqueous medium and while subjected to an electric field, behave like electro-negative ions, the materials either being intrinsically electro-negative or made electro-negative by appropriate means.

Many of the processes developed in the mineral industry, particularly for processing china clays, require concentrating of suspensions which contain very fine or even colloidal particles. In general, the dehydration techniques, which resort to the classical operations of filtration, sedimentation, centrifuging, cyclone settling, and drying by heat, are either too inefficient as they do not make it possible to obtain a sufficiently dry solid, or have a prohibitive cost from the economic viewpoint. But for particles with a diameter not exceeding 10 microns, electrofiltration is an efficient way of concentrating, which involves for the same final result an energy equal to only one tenth of that required by a thermal drying operation.

The principle of electrofiltration is known per se. In this operation, a suspension containing the solid particles to be separated from the liquid carrier is subjected to an electric field generated between two electrodes. This implies, first of all, that the suspension to be treated can conduct electric current. When the solid particles are electro-negative, they migrate under the influence of the electric field toward the anode on which they tend to deposit. The liquid set free by the movement of the solid material moves in the opposite direction and therefore migrates with the electropositive ions present in the suspension toward the cathode. The movement of solid particles and of liquid in opposite directions causes separation of the two phases, with the solid phase being concentrated by deposition on the anode.

Of course, the efficiency of the operation depends upon a certain number of parameters only the most important of which will be cited:
dispersion of the particles within the surrounding liquid mass, the dispersion being a function of the specific weight of the particles and of their electrokinetic potential also termed zeta potential;
mobility of the solid particles, which depends upon the zeta potential, the electric field applied to the particles, and the viscosity of the liquid in which the particles move;
the medium's intrinsic electric resistivity which determines the amplitude of the current flowing in a given electric field.

Electro-negative features and the importance of such features, which significantly influence the dispersion of the particles within the liquid phase, can originate from the use of mineral additives or water-soluble organic additives. These additives, which are introduced in very small amounts, adhere to the solid particles by absorption, make them more or less electro-negative, and therefore contribute to their dispersion within the liquid. Further, they may modify the intrinsic ionicity of the liquid and, hence, affect the resistivity of the medium.

Other parameters associated with the concept and the building of electric filtration cells determine the efficiency of operation of these cells. Among them one can cite the shape of the electrodes, their position, their spacing, and the type of the materials of which the electrodes are made.

The specific problems which are encountered by those skilled in the art in any electrofiltration operation are: obtaining, by deposition on the anode, sufficiently dry solids to be collected, and eliminating the liquid displaced by the concentration of the solid material deposit.

In order to increase the efficiency of the accumulation of the solids, the form of the anode has been modified in the course of time. For many years the use of rotary anodes in the form of a drum allowing the simultaneous continuous deposition and removal of solid cakes has been known, particularly from U.S. Pat. No. 1,133,967. The drum, the axis of which is horizontal, is half-way immersed in a tank containing the suspension to be concentrated. The solids are continuously collected by scraping with an appropriate device (knife, wire, scraper) from the anode surface while the latter emerges during its rotation from the suspension.

Similarly (see U.S. Pat. Nos. 3,972,799 and 4,107,026 and French Patent 2,552,096), the use of disk-shaped anodes facilitating a substantial increase in active surface at a given volume of the equipment has been known. These anodes are vertically mounted on a horizontal shaft and rotate semi-immersed in a tank supplied with the suspension to be treated. In constant intervals between each of the anodes there are mounted partitions integral with the tank, electrically insulated from it, and connected to the negative pole of a current generator.

Owing to the oxidation which takes place at the anode by release of oxygen and which can imply a degrading of the anode by corrosion, those skilled in the art have turned to:
either protecting the anode by providing in its immediate vicinity a semi-permeable membrane defining an anode compartment of small volume, with the cake of solids deposited on the membrane to avoid in this way the contamination of the solids deposited by corrosion products from the anode (U.S. Pat. No. 4,048,038 and Addition Certificate 2,423,254 to French Patent 2,354,802);
or utilising noncorrodible electrodes made from noble materials (e.g., tantalum) or from metals coated by electroplating with these noble materials (titanium, platinum) or from metal oxides not susceptible to corrosion.

Nevertheless, those skilled in the art always encounter the problem of continuously eliminating the water liberated by migration and electrolytic deposition of solids on the anode and, at the same time, of maintaining a constant concentration of the suspension present in the electro-separation cell.

The first cells did not comprise a semi-permeable membrane which would have defined an anode compartment and a cathode compartment.

According to U.S. Pat. No. 1,132,967, the cathodes used are formed by metal elements in the form of rods or plates providing space for the passage of the liquid phase. Electrodes used by other inventors were a wire gauze wound upon a drum forming the cathode (U.S. Pat. No. 1,435,886). The anode formed by an endless ribbon mounted on rollers contacts the cake deposited on the drum and assumes its curvature. The production of a concentrated solid deposit by elimination of the water in the cake is furthered either by application of a contact pressure between the ribbon mounted on the rollers and the drum or by subjecting the drum to a negative pressure. For the purpose of increasing the efficiency of dehydration, one combines in this way the extraction of the liquid by electroosmosis and filtration either by applying an external pressure or by a pressure reduction.

Subsequently the search for higher efficiency led those skilled in the art to the use of semi-permeable membranes to form two clearly separated compartments, the anode compartment and the cathode compartment. The function of the semi-permeable membranes is to allow passage of the liquid and to remain impermeable to the passage of the solids. When the suspension to be treated has been introduced into the anode compartment and the electro-negative ions migrate toward the anode, the membrane acts as a filter medium with respect to the cathode. The liquid, the volume of which corresponds to the volume of the solids migrating toward the anode, is displaced by drag forces in the opposite direction, toward the cathode, passes through the filter medium, and enters into the cathode compartment. The passage of the liquid through the medium depends upon a certain number of factors associated, on the one hand, with the composition of the medium proper (type of material, porosity, permeability, . . . ) and, on the other hand, with the medium itself (viscosity of the liquid acting as the electrolyte of which water is the main component).

The passage of the liquid across the medium toward the cathode compartment can be facilitated, as indicated above, by a reduced partial pressure in this compartment (U.S. Pat. No. 4,003,849), and this is equivalent to increasing the acting pressure of the osmotic flow across the medium. Adjustment of the liquid extraction by adjusting the level of the catholyte has been claimed in U.S. Pat. No. 4,107,026. It is known that the water flow rate across the medium is related to the loss of charge of the flow. Since the desired goal is to have the solid particles migrate in the direction of the anode, there exists an electric field value, the so-called "critical value", beyond which the electric force exceeds the drag force upon the particle in equilibrium. The strength of the electric field applied therefore must be above this "critical value" to avoid that the finest particles, which are transported by the displacement of the liquid, gradually accumulate on the cathodic filter medium. By countering the flow through the medium, this accumulation makes the passage of the aqueous phase more difficult.

The entry of water into the cathode compartment by passage through the medium causes dilution of the electrolyte (termed catholyte) which is present in this compartment. The need for maintaining a certain concentration of the catholyte to ensure electric current flow from the cathode to the suspension to be treated has led the researchers to extracting the diluted electrolyte for the purpose of renewing it by bleeding it directly into the cathode compartment.

Adjustment of the discharge of liquid extracted from the cathode compartment has been claimed in French Patent 2,354,802 and in its Addition Certificate 2,423,254. The extraction of the aqueous phase from the cathode compartment is adjusted by continuously measuring the liquid level of the catholyte and influencing either independently or simultaneously the following two parameters: the reduced pressure above the liquid level of the cathode compartment, and the density of the electric current flowing through the electro-separation cell.

Indeed, the passage of liquid across the cathodic filter medium is facilitated by permanently maintaining a low pressure above the level of the catholyte. The partial vacuum above the cathode is adjusted with the aid of a vacuum pump controlled by the measurement of the low pressure. Furthermore, the development of a slight deposit of fine solid particles on the filter medium or the accumulation of those particles in its close vicinity can be enhanced or reduced by modifying the electric field strength and, hence, the current density. An increase in the current density causes a corresponding increase in the velocity of the solid particle migration toward the anode. A decrease in current density implies the development of a particle deposit on the filter medium, with the deposit opposing the passage of liquid. By simultaneously adjusting the two parameters (reduced pressure above the level of the catholyte and current density), those skilled in the art have achieved balanced operation of the cell for a fixed discharge rate of the filtrate out of the cathode compartment.

Nevertheless, Applicant's experience has shown that in the course of time, after a certain number of hours of operation, the regulation does not account for the fact that the two parameters mentioned above turn out to be insufficient for maintaining efficient operation of the electro-separation cell because one observes at the same time a progressively decreasing deposition of solids on the anode, a decrease in the discharge of the filtrate passing through the cathode medium, and an increase in the pH of the catholyte to high alkaline values.

In order to increase the efficiency of the separation of solids, those skilled in the art have resorted to the introduction of acid additives into the cathode compartment. From the above-cited U.S. patents (U.S. Pat. Nos. 3,980,547, 4,003,811, and 4,048,038) it has been known to use for this purpose mineral acids such as hydrochloric acid, sulfuric acid, or phosphoric acid. According to those patents, one tries to keep the pH of the catholyte between 2 and 7, with the concentration of the acid solution introduced changing from 0.1% to 10% by weight (U.S. Pat. No. 3,980,547) or from 0.1% to 1% by weight (U.S. Pat. Nos. 4,003,811 and 4,048,038).

To the extent to which the aqueous phase, which comes from the anode compartment, penetrates the membrane in the cathode compartment by electroosmosis, the ensuing dilution of the catholyte implies a change of the electric characteristics (specifically of the resistivity) of the latter. In order to maintain the electric current flow on an adequate amplitude, the properties of the catholyte and, hence, its composition must not vary beyond certain limits. In order to extract the aqueous phase as indicated above, and in order to maintain a steady current flow at the known amplitudes, those skilled in the art (U.S. Pat. Nos. 3,980,547, 4,003,811, and 4.048,038) have resorted to providing open continuous circulation of the catholyte across the cathode compartment. Fresh catholyte is continuously introduced directly into the cathode compartment and, the used catholyte is extracted from that compartment. As indicated above, an acid solution is admixed to the fresh catholyte to maintain the pH of the catholyte contained in the cathode compartment within the range 2-7.

In other prior-art embodiments, some electro-separation systems comprised a second semi-permeable membrane which is situated around the anode and defines a closed space termed anode compartment. The purpose of this membrane, which likewise forms a filter medium and on which the solid particles are deposited by electrophoresis, is to avoid contamination of the deposit by the corrosion products from the anode (U.S. Pat. No. 4,048,038).

The electrolyte contained in the anode compartment is termed anolyte and contains mineral salts some of which dissociate in the electrochemical reactions taking place near the anode. The resulting changes in the electrical properties require, as in the case of the catholytes, renewal of the anolytes for maintaining their composition close to constant values.

French Addition Certificate 2,423,254 has disclosed devices effecting this renewal. The system comprises a set of units arranged in the form of a closed loop on the anode compartment. The anolyte extracted first passes into a degassing chamber in which the gas generated by electrochemical decomposition of the electrolyte contacting the anode is separated from the liquid phase. Under the influence of the force of gravity, the liquid phase runs into a buffer vessel before being returned by a pump to the anode compartment. The used anolyte is directly extracted from this buffer vessel. Similarly, fresh anolyte contained in an intermediate storage tank is introduced at a point of the circuit upstream relative to the buffer vessel. Nevertheless, since the extraction of the used anolyte is made directly via an overflow limit set onto the buffer vessel through which the recycled anolyte flows toward the anode compartment, the system cannot work efficiently in the form described if the introduction of new anolyte into the circuit and the bleeding of the used anolyte are made discontinuously and independently of each other. As a consequence, the composition of the electrolyte in the closed circulation on the anode cannot be kept constant as described in the above-cited certificate and varies between limit values which have not been specified.

Further, since the anolyte is an NaCl solution, chlorine, which is released at the anode, is produced by electrolytic reaction. As indicated in French Addition Certificate 2,423,254, this chlorine must be eliminated or possibly reintroduced into the cathode compartment. But the handling of chlorine gas and its reintroduction into that compartment pose serious problems. When the chlorine is introduced into the atmosphere of the hydrogen liberated in the cathode compartment, an explosive mixture can develop. When the chlorine is directly injected into the catholyte, the injection implies the development of hypochlorous acid with a small dissociation constant which does not impede the gradual change of the catholyte to a highly alkaline pH. Further, the hypochlorites produced in the catholyte are aggressive compounds which destroy the cathode by corrosion and contaminate the catholyte the extracted fraction of which cannot be released into the natural environment.

Thus, whatever the teachings of the prior art in regard to treating the catholyte, namely the injection of chlorine or the introduction of mineral-acid solutions ($HCl$, $H_2SO_4$, $H_3PO_4$), the catholyte then contains foreign elements such as sulfur, chlorine, and phosphorous which initially were not present in the suspension to be treated. The fraction of the catholyte drawn from the cathode compartment is an effluent which, before it is discarded, requires an appropriate treatment so that the anti-pollution regulations are fulfilled.

It is scientifically known that the volume of the aqueous phase eliminated corresponds to the volume of the aqueous phase displaced by electroosmosis across the cake of the solid particles deposited on the anode. Therefore, continuous electro-separation, without sudden stops, requires at the same time perfect uniformity of the transition of the aqueous phase across the filter medium and excellent uniformity of its extraction.

Applicant has shown by his research that the hydroxyl ($OH-$) ions generated near the cathode by the electrolysis reaction are important. These ions, which migrate toward the anode, collide during their movement with the barrier which the cathodic filter medium forms and hinder the passage of the aqueous phase in the opposite direction through that medium.

The accumulation of hydroxyl ions in the cathode compartment therefore unfavourably affects the operation of the cell as the passage of the aqueous phase toward the cathode is impeded and, hence, the concentration of the solids deposited on the anode by electroosmosis is disturbed. This accumulation is converted into a change in the pH of the catholyte which develops to highly alkaline values. Therefore, after a certain number of hours of operation, this accumulation leads to a greatly impaired operation of the cell with the risk of blocking, regardless of the adjustment of the other parameters affecting electro-separation (electric field, current density, resistivity of the medium, low pressure on the cathode compartment, etc.).

SUMMARY OF THE INVENTION

The present invention relates to a continuous process of separating by electrophoresis or electroosmosis, electro-negatively charged mineral particles suspended in an aqueous medium, wherein catholyte treatment is continuously effected by an agent which, by modifying the ratio of the normally present ion species, ensured efficient electro-separation of the solids by continuous and uniform development of a particle deposit on the anode, increases the efficiency of the osmotic passage of the aqueous phase across the cathodic filter medium, makes it possible to maintain the pH of the catholyte within a range close to the neutral point, does not introduce into the catholyte any foreign element which would modify the catholyte composition and which had not been present in the suspension to be treated, and therefore makes non-polluting the aqueous phase extracted from the cathode compartment for eliminating excess water.

According to the invention, the continuous process of separating fine mineral particles in suspension in an aqueous medium by electrophoresis and electroosmosis comprises the steps of:

(continuously) introducing the suspension containing the electro-negative solid material into an electroseparation cell having an anode and a cathode between which an electric field is maintained, the cathode being provided with a filter medium permeable to only one liquid phase and defining a cathode compartment containing a catholyte, whereas the space between the filter medium and the anode is the treatment region of the suspension, from where the excess of the suspension is removed by appropriate means, moving the solid particles by an electric field, depositing the particles in the form of a cake on the anode surface, and unloading the cake outside the suspension-treatment region;

displacing the liquid phase in the opposite direction, toward the cathode department, filtering through the filter medium under the influence of a reduced pressure, and removal from that compartment, and is characterised in that, in order to simultaneously and continuously develop a uniform deposit of the solid phase on the anode and to obtain uniform extraction of the liquid phase with a water yield at least equal to 1, the yield being defined by the ratio between the amount $Q_1$ of water passing per unit time through the cathodic filter medium and the theoretical value $Q_T$ of water displaced per unit time by electroosmosis, a) into the cathode compartment there is discharged an amount $Q_3$ of catholyte per unit time, with $Q_3$ greatly exceeding $Q_T$, b) the amount $Q_3$ is split into two fractions $Q_1$ and $Q_2$, with $Q_1$ being discarded, c) the fraction $Q_2$ is continuously treated in a treatment device outside the electro-separation cell with the aid of a treatment agent, d) the treated fraction $Q_2$ is continuously reinjected into the cathode compartment for the purpose of modifying the ratio of the species of ions present in the catholyte and of making the catholyte itself to a natural discardable product.

Indeed, in numerous experiments Applicant has shown the importance of the yield of the water extraction, with the yield defined as the ratio of the amount $Q_1$ of water which passed per unit time across the filter medium and is definitely discarded to the theoretical amount $Q_T$ which was moved per unit time by electroosmosis during the development of the solid particle deposit on the anode.

Experience shows that a yield at least equal to 1 and conveniently greater than 1 and preferably in the range between 1.01 and 1.50 is an absolutely necessary condition for continuous and uniform operation of the electro-separation cell.

Thus, when the concentration of dry materials of the suspension to be treated is known and when the content of the dry material of the cake gathering on the anode is determined, it is possible to determine the amount $Q_T$ of the liquid moved per unit time by electroosmosis in the cake and, hence, to determine the amount $Q_1$ to be definitely discarded per unit time. Then the fraction $Q_1$ being defined, an amount $Q_3$ greatly exceeding $Q_T$ is discharged of the catholyte per unit time, $Q_3$ being split into two fractions $Q_1$ and $Q_2$, with $Q_1$ being discarded while $Q_2$ is continuously treated in a treatment device.

The fraction $Q_2$ to be reintroduced into the cathode compartment after treatment is adjusted so that the ratio $Q_2/Q_T$ is at least equal to 1.5, conveniently equal to at least 2.5, and preferably between 4 and 8 to enhance diffusion and the mixing of $Q_2$ within the catholyte present in the cathode compartment.

During bleeding of the fraction $Q_3$, one measures its pH and compares the measured value with a set value. The comparison between the two pH values makes it possible to adjust the admission of the treatment agent to the fraction $Q_2$ to obtain in the cathode compartment a pH close or equal to the pH desirable for the fraction $Q_1$.

In general, the pH of the fraction $Q_1$ to be eliminated is determined by the user and makes it possible to define the set pH value. In a preferred embodiment and for satisfying the anti-pollution regulations, the pH of the fraction $Q_1$ is within the range 6.5–8.

In order to facilitate the passage of the fraction $Q_1$ across the filter medium, one creates in conventional fashion a reduced pressure in the cathode compartment. The reduced pressure is usually set to a value of at least $6.5 \cdot 10^3$ Pascal (corresponding to 50 millimeters of the mercury column) and preferably to values between $13 \cdot 10^3$ and $47 \cdot 10^3$ Pascal (corresponding to 100–350 mm Hg).

The treatment agent used in the process is an acid agent and preferably carbonic acid gas ($CO_2$).

For properly practicing the process of the invention, the electrical operating characteristics of the electroseparation cell are as follows:

the electric field strength between the electrodes is selected in the range 1–25 volts/cm and preferably in the range 5–15 volts/cm;

the electric current density is adjusted to the range 1–20 milliamperes/cm$^2$ and preferably to 5–16 milliamperes/cm$^2$.

According to the invention, the suspension to be treated contains fine mineral particles, which are intrinsically electro-negative or were made electro-negative, and has usually an electric resistivity in the range of 250–2500 $\Omega$.cm and preferably between 500 and 1800 $\Omega$.cm to allow the passage of a current of sufficient intensity while the consumption of electric energy remains limited.

The invention will be better understood from the following description based on a circuit scheme (FIG. 1) illustrating the process without limiting its scope.

DETAILED DESCRIPTION OF THE INVENTION

Figure 1:
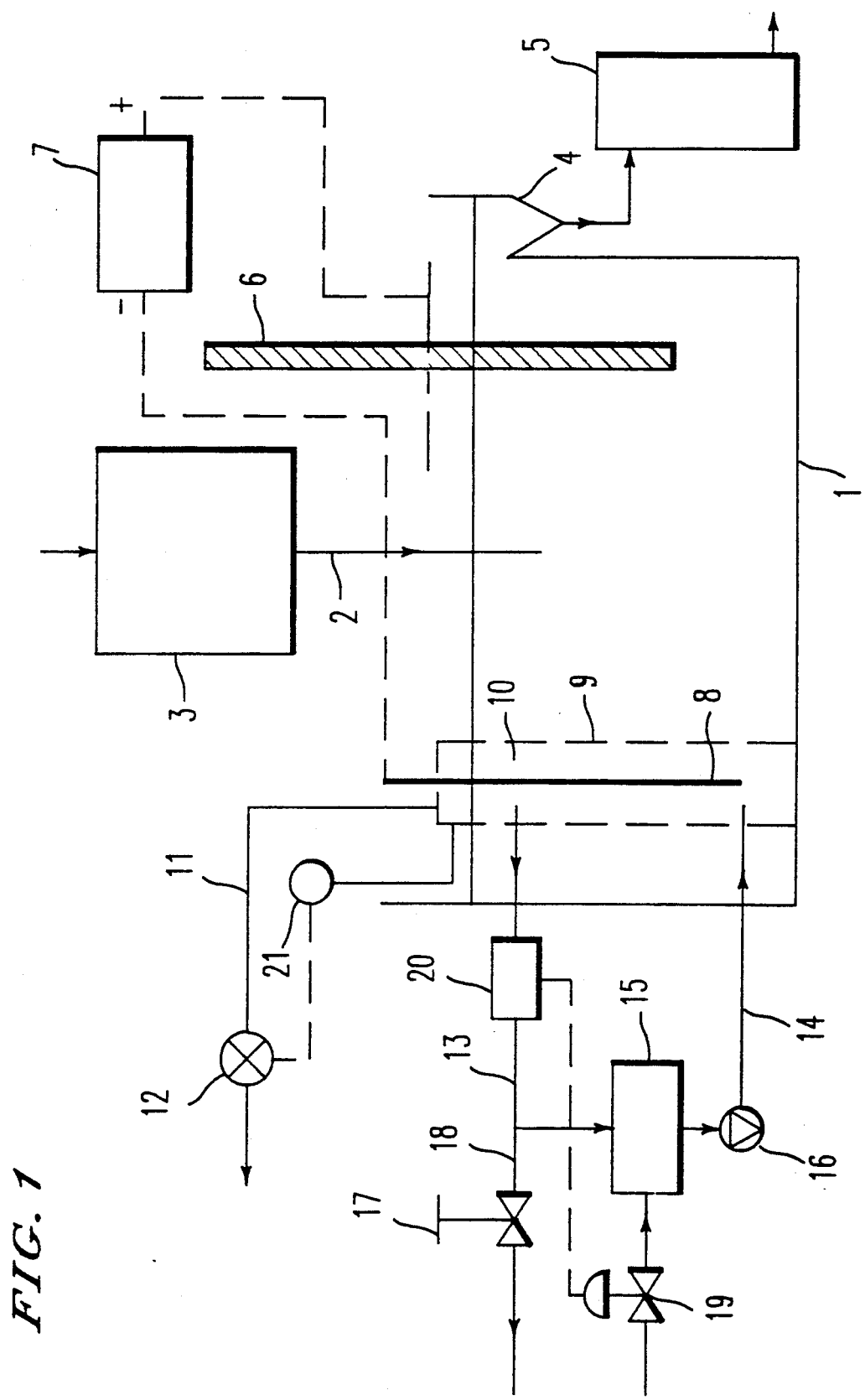
FIG. 1 shows a circuit scheme for the continuous process of separating electrically charged mineral particles in suspension.

According to FIG. 1, in practice the device consists of an electroseparation cell comprising a vessel 1 provided with a supply duct 2 connected to a supply tank 3 containing the suspension to be treated and with a spillway 4 connected to a receiving vessel 5. Inside vessel 1 there are mounted one or several rows of alternating cathode and anode electrodes with adjustable spacing and with their plane surfaces parallel to each other. Anodes 6 connected to the positive pole of an external current source 7 either can be rectangular, and it is then possible to move them up and down in parallel in a vertical plane to have the anodes emerge from the electrolyte tank in which they are immersed to accumulate the cake of solids deposited in the course of the electrolysis;

or are preferably given the shape of circular disks driven in rotational motion around their horizontal axis while, in this case, the cake of solids is continuously removed from the disk section emerged from the suspension by some means known to those skilled in the art (knife, wire, scraper, etc.).

These electrodes are made from a noble metal such as titanium coated with a thin platinum layer by electroplating or from some other metal or metal oxide withstanding the corrosion by the gas generated at the anode or by the $H^+$ ions associated with gas liberation during the electrochemical reaction.

The cathodes 8 are formed by fixed members which, in one embodiment of the invention, can have the form of semi-circular stainless steel sectors fully immersed in the suspension and connected to the negative pole of the current generator 7. Each of the cathodes is provided with a filter medium 9 defining a closed volume 10 which is termed the cathode compartment and contains the catholyte.

The cathode compartment is:
connected through a duct 11 which ends in its upper section at a vacuum pump 12 allowing the regulation of the reduced pressure above the catholyte level around a set value as prescribed by a measuring instrument 21 of that negative pressure in the cathode compartment; and
connected through ducts 13 and 14, which enter the compartment under the catholyte level, to a device 15 providing for continuous injection and adjustment of the treatment agent (carbonic acid gas $CO_2$) in the closed loop formed by the assembly of the two ducts, injection device 15, and cathode compartment 10.

Continuous circulation of the catholyte is obtained with a pump 16 in the resulting circuit. The treatment agent is injected by some means known to those skilled in the art to obtain efficient contact of the treatment agent with the liquid. The device used must be adapted to the treatment agent used and to the amount $Q_2$ of the circulating catholyte.

When the treatment agent is carbonic acid gas ($CO_2$) and when the equipment is of low capacity, the $CO_2$ injection device can be a sintered glass disk. In the case of greater liquid and gas flows, devices known to those skilled in the art of chemical engineering should be used, namely packed columns or dispersion columns. The flow rate of the treatment agent is adjusted by pH meter 20 which continuously measures the pH of the catholyte extracted from the cathode compartment. After comparison of the pH value with a set value, a control valve 19 which modifies the flow rate of the agent introduced into the circuit is actuated to permanently maintain in the cathode compartment a pH close to the pH selected by the user.

An amount $Q_3$ of the catholyte is continuously extracted per unit time from compartment 10 through duct 13. The volume $Q_3$ is set to a value much greater than $Q_T$. Volume $Q_1$ is drained from the total discharge $Q_3$ of the catholyte leaving compartment 10 and bleeded from the circuit through a valve 17 and a duct 18. When the treatment agent is $CO_2$ and the eliminated fraction $Q_1$ is an effluent whose continuously monitored pH and content of chemical components conform to the standards specified by the anti-pollution laws for discarded materials, the difference $Q_3-Q_1$, i.e., $Q_2$, is treated in device 15 of introducing the agent and returned into the lower part of cathode compartment 10 through pump 16 and return duct 14. When the treatment agent is $CO_2$, the use of an appropriate device 15 for injecting the gas renders a homogeneous dispersion of the gas in the liquid fraction $Q_2$. The continuous re-introduction of this fraction into the circuit in the lower part of the cathode compartment and the extraction of the fraction $Q_3$ at the top of the compartment ensure complete diffusion of the catholyte treated within the catholyte distributed over the entire height of the cathode compartment. The flow rate $Q_2$ is such that a sufficient amount of $CO_2$ gas is absorbed to neutralise the hydroxyl ions generated in the cathode compartment and to maintain a pH greater than or equal to, say, 8 in that compartment. In view of the weak alkalinity of the catholyte extracted from the cathode compartment and owing to the low solubility of $CO_2$ in the catholyte, the ratio of the mass flow rates of the circulating liquid and the $CO_2$ gas is very important for ensuring the required absorption of $CO_2$ gas.

In the form described, the process of the invention can be used to treat all suspensions containing fine particles of electro-negative solid materials for the purpose of separating the particles from the liquid phase in which they are kept in suspension. Such suspensions may contain very dissimilar materials such as calcium carbonate, china clays, silicates, oxides of titanium and aluminium, calcium phosphates, gypsum, etc.

The concentration of solids in the cake obtained by electro-separation can reach values exceeding 75% for concentrations of 20–50% by weight of the suspensions treated.

In order to more clearly show the possibilities offered by the invention, the following two examples relate to the electro-separation of a suspension of calcium carbonate and to the electro-separation of a suspension of china clays.

EXAMPLE 1

A calcium carbonate ($CaCO_3$) suspension with a concentration of 49.6% of solids was used; an organic polymer (sodium polyacrylate) in concentrations of 0.3–0.4% by weight, referred as dry material to dry calcium carbonate, was introduced into the suspension. This polymer, which is adsorbed on the calcium carbonate particles, generates negative charges on the solid particles. The resistivity of the aqueous phase is close to 600 $\Omega$.cm.

The electric field appearing at the electrodes is 11.7 volts/cm, which with an electrode spacing of 6 cm corresponds to a total field of 70 volts. The current density is close to 16 milliamperes/cm$^2$. The reduced pressure above the liquid level in the cathode enclosure is $26.10^3$ Pascal (i.e., about 200 mm mercury column).

At a flow rate of 765 kg/h of the suspension supplied to the electroseparation cell and a mass of 506 kh/h of cake gathered with a solid $CaCO_3$ concentration of 75%, the flow rate $Q_1$ of the liquid removed from the cell and discarded from the cathode compartment is 263 liter/h. The theoretical flow rate $Q_T$ of the water displaced by electroosmosis during the deposition of the solid materials on the anode is 259 liter/h. Thus, the water extraction yield is close to 1.015. The total flow rate $Q_3$ from the cathode compartment is 1763 liter/h. The flow rate $Q_2$ of the catholyte recycled into the cathode compartment is 1500 liter/h, corresponding to a $Q_2/Q_T$ ratio of 5.79. The pH of the catholyte $Q_3$ extracted is 7.9. The injection of $CO_2$ is adjusted so that at a liquid recirculation flow rate $Q_2$ of 1500 liter/h, the pH of the fraction $Q_2$ is reduced to 7.3. Under these conditions, the flow rate of the $CO_2$ gas is 0.4 kg/h which corresponds to a $CO_2$ consumption of slightly more than 1 gram (i.e., 0.51 liters under normal conditions of pressure and temperature) per kilogram of $CaCO_3$.

The effluent $Q_1$ extracted from the cell under the operational conditions stated above has the following chemical composition:

| $Na^+$ | 1.2 g/liter | $HCO_3^-$ | 3.61 g/liter |
|---|---|---|---|
| $Ca^{++}$ | 34.5 mg/liter | chemical oxygen demand | 80 mg/liter |
| $Mg^{++}$ | 0.7 mg/liter. | | |

As indicated above, the pH of $Q_1$ is 7.1. Since a polyvinyl chloride diaphragm with a small pore size is used as the filter medium defining the cathode compartment, the concentration of solids present in the effluent is less than 50 mg/liter.

The chemical composition, the pH, and the concentration of solids are such that the liquid effluent is non-polluting and that it can be discarded as such without additional treatment for making it conform to the anti-pollution regulations for discarding materials.

EXAMPLE 2

This example relates to the separation of china clay particles present in an aqueous suspension with a solid material concentration of 24.6%, into which a dispersing agent in the form of a copolymer of sodium acrylate and acrylamide is introduced in a concentration of 0.6%, expressed as dry weight per dry weight of china clay.

The system used was the same as in Example 1, but the electrode spacing was reduced to 5 cm instead of 6 cm. The voltage at the terminals of the current generator was close to 56 volts, which corresponds to an electric field strength of about 11.2 volts/cm. The current density was maintained at 8 milliamperes/cm². The reduced pressure above the catholyte level in the cathode compartment was $13.10^3$ Pascal (i.e., about 100 mm Hg column). Under the operational conditions defined in this way and with a supplying flow rate of the order of 489 kg/h to the cell, the amount of moist china clay deposited on the anode was 261 kg/h, the concentration of the solids in the china clays amounting to 46.9%. The flow rate $Q_1$ of the liquid extracted from the cathode compartment and definitely discarded thereafter was 300 liter/h at a theoretical flow rate $Q_T$ of 228 liter/h of the water displaced by electroosmosis. The yield of the water extraction therefore was 1.315. The amount of $CO_2$ injected into the catholyte fraction $Q_2$ recirculated into the cathode compartment was adjusted so that the pH in the cathode compartment varied in the range 6.7-7.3. The aqueous fraction $Q_3$, which was extracted from the cathode compartment and the eliminated portion $Q_1$ of which is an effluent, had a pH close to the neutral point. The concentration of the elements calcium and sodium in that effluent was as follows:

| $Na^+$ | 700 mg/liter | $Ca^{2+}$ | 21 mg/liter |
|---|---|---|---|

The chemical oxygen demand was between 20 and 40 mg/liter.

As in the Example 1, the amount of solids present in suspension in the effluents was below 50 mg/liter.

EXAMPLE 3—COMPARATIVE EXAMPLE

The importance of $CO_2$ is illustrated by the following example in which the same suspension of china clay (English china clay) was treated during the same test period in a laboratory cell, first with $CO_2$ gas injection and thereafter without it.

The operating conditions of the cell were as follows:

| electric field strength | 11.5 volts/cm |
|---|---|
| electrode spacing | 5 cm |
| current density | 8 milliamperes/cm² |
| reduced pressure above the catholyte level in the cathode compartment | $13.10^3$ Pascal (i.e., about 100 mmHg column). |

The china clay suspension treated had an initial concentration of 25.9% of solid materials. A dispersing agent consisting of a copolymer of sodium acrylate and acrylamide was introduced in the suspension in a concentration of 0.6% by weight, expressed as dry weight per dry weight of china clay.

Two tests were made, one without $CO_2$, the other one with $CO_2$ injection according to the invention adjusted so that a pH value close to 8 was maintained in the cathode compartment; each of these tests lasted 12 hours.

Table 1 lists for the experiments with and without $CO_2$ gas the following values in the first, third, sixth, and twelfth hour of cell operation:
- amounts of solids, expressed as dry materials on the anode;
- the flow rate, expressed in liter per hour, of the water extracted from the cathode compartment; and
- the water yield ($Q_1/Q_T$).

On the basis of this table, it is interesting to note that without $CO_2$ injection, the water yield of the cell and the mineral amount deposited on the anode decrease in the course of time, the loss in yield amounting to about 13% in twelve hours, i.e., to slightly more than one per cent per hour, whereas with $CO_2$ injection the yield and the amount of solids deposited on the anode remain constant in the course of time.

TABLE I

| | Without Injection of $CO_2$ | | | With Injection of $CO_2$ | | |
|---|---|---|---|---|---|---|
| | Amount of Dry China Clay (kg/h) | Water Removed (liter/h) | Yield of Water | Amount of Dry China Clay (kg/h) | Water Removed (liter/h) | Yield of Water |
| At the end of the first hour of operation | 1,22 | 1,985 | 0,96 | 1,208 | 3,12 | 1,33 |
| Between the second and third hour of operation | 1,099 | 1,970 | 0,94 | 1,236 | 3,02 | 1,32 |
| Between the fifth and sixth hour of operation | 1,081 | 1,970 | 0,91 | 1,207 | 2,91 | 1,34 |
| Between the eleventh and twelfth hour of operation | 1,062 | 1,980 | 0,87 | 1,234 | 3,05 | 1,32 |

We claim:

1. A continuous process of separating fine mineral particles in suspension in an aqueous medium by electrophoresis and electroosmosis, consisting essentially of:

a) continuously introducing the suspension containing an electro-negative solid material into an electro-separation cell having an anode and a cathode between which an electric field is maintained, said cathode being provided with a filter medium permeable to only one liquid phase in defining a cathode compartment containing a catholyte, wherein a space between the filter medium and the anode is a treatment region for the suspension, from which an excess of the suspension is removed;

b) displacing solid particles in a suspension under the influence of an electric field, depositing particles in the form of a cake on the anode surface, and unloading the cake outside of the suspension-treatment region; and c) displacing a liquid phase of said suspension in the opposite direction, towards said cathode compartment, filtering the liquid phase through the filter medium under the influence of a reduced pressure and removing the liquid phase from that compartment; and wherein said continuous process further consisting essentially of:

d) introducing an amount of catholyte into said cathode compartment which, per unit time, is substantially in excess of the amount of water displaced by electroosmosis;

e) separating said reduced catholyte into two fractions, said first fraction being discarded and having the pH thereof measured and compared to a value in a range close to neutral pH, said second fraction being continuously treated in a treatment device fluidly connected to and outside of the electro-separation cell with either carbon dioxide gas or carbonic acid, thereby adjusting the pH of the second cathode fraction to said value in said range close to neutral pH, without the addition of a mineral acid additive, and then f) continuously reinjecting the pH-adjusted second cathode fraction into the cathode compartment, thereby modifying the ratio of ion species present in the catholyte and rendering the catholyte suitable for being discarded such that said first cathode fraction has a pH value in a range close to neutral pH; and whereby a uniform solid phase is deposited on the anode in a continuous manner, and a uniform extraction of liquid phase is obtained, wherein a ratio between the amount of water passing through the cathodic filter medium per unit time and the theoretical amount of water displaced per unit time by osmosis has a value of at least 1.

2. The process according to claim 1, wherein the ratio of the amount of water passing through the cathodic filter medium per unit time and the theoretical amount of water displaced per unit time by osmosis is greater than 1.

3. The process according to claim 2, wherein the ratio is between 1.01 and 1.5.

4. The process according to claim 1, wherein the ratio of the fraction being continuously treated in the treatment device outside of the electro-separation cell to the theoretical amount of water displaced per unit time by electroosmosis is greater than 1.5.

5. The process according to claim 4, wherein the ratio is between 4.0 and 8.0.

6. The process according to claim 1, wherein the pH of the discharged catholyte fraction is continuously measured and compared with a set value.

7. The process according to claim 6, wherein the pH value is between 6.5 and 8.0.

8. The process according to claim 1, wherein the introduction of the treatment agent is determined by the measured pH value and the set pH value.

9. The process according to claim 1, wherein the process is effected in the cathode compartment, which is subjected to a reduced partial pressure of at least $6.5 \times 10^3$ pascal.

10. The process according to claim 9, wherein the reduced partial pressure is between $13 \times 10^3$ and $47 \times 10^3$ pascal.

11. The process according to claim 1, wherein the suspension introduced has a resistivity which is adjusted to a value between 250 and 2,500 $\Omega \cdot cm$.

12. The process according to claim 1, wherein the two electrodes have an electric field therebetween of about 1 and 25 volts/cm.

13. The process according to claim 12, wherein the electric field between the two electrodes is about 5 and 15 volts/cm.

14. The process according to claim 1, wherein the current density ranges from 1 to 20 milliamperes/$cm^2$.

15. The process according to claim 14, wherein the current density range is between 5 to 16 milliamperes/$cm^2$.

16. The process according to claim 1, wherein said suspension containing fine mineral particles comprises calcium carbonate, China clays, silicates, oxides of titanium and aluminum, calcium phosphates and gypsum.

* * * * *